United States Patent
Schurgers et al.

(10) Patent No.: US 12,516,226 B2
(45) Date of Patent: Jan. 6, 2026

(54) PRESSURE-SENSITIVE ADHESIVE COMPOSITION AND SURFACE PROTECTION SHEETS INCLUDING THE SAME

(71) Applicant: NITTO BELGIUM NV, Genk (BE)

(72) Inventors: Ben Schurgers, Zonhoven (BE); Bernardo Trovato, Genk (BE); Charly Hoebers, Genk (BE)

(73) Assignee: NITTO BELGIUM NV, Genk (BE)

( * ) Notice: Subject to any disclaimer, the term of this patent is extended or adjusted under 35 U.S.C. 154(b) by 601 days.

(21) Appl. No.: 17/972,281

(22) Filed: Oct. 24, 2022

(65) Prior Publication Data
US 2023/0126433 A1    Apr. 27, 2023

(30) Foreign Application Priority Data
Oct. 25, 2021 (EP) ..................... 21204397

(51) Int. Cl.
| | |
|---|---|
| C08F 2/46 | (2006.01) |
| C08F 2/50 | (2006.01) |
| C08G 61/04 | (2006.01) |
| C09J 7/22 | (2018.01) |
| C09J 7/38 | (2018.01) |
| C09J 11/06 | (2006.01) |
| C09J 133/12 | (2006.01) |

(52) U.S. Cl.
CPC ............ *C09J 7/385* (2018.01); *C09J 7/22* (2018.01); *C09J 11/06* (2013.01); *C09J 133/12* (2013.01); *C09J 2301/122* (2020.08); *C09J 2301/302* (2020.08); *C09J 2301/312* (2020.08); *C09J 2301/408* (2020.08); *C09J 2400/226* (2013.01)

(58) Field of Classification Search
CPC ....... C09D 133/064; C09J 133/12; C09J 7/22; C09J 7/385; C09J 11/06; C09J 2400/226; C09J 2301/302; C09J 2301/312; C09J 2301/122; C09J 2301/408; C08F 220/1802; C08F 220/06; C08F 220/1804

USPC .......... 522/53, 49, 6, 71, 189, 184, 1; 520/1
See application file for complete search history.

(56) References Cited

U.S. PATENT DOCUMENTS

| | | | |
|---|---|---|---|
| 2010/0129569 A1 | 5/2010 | Park et al. | |
| 2011/0111240 A1 | 5/2011 | Yuan et al. | |
| 2013/0158199 A1* | 6/2013 | Iseki | ...................... C09J 133/14 |
| | | | 525/123 |
| 2014/0037952 A1* | 2/2014 | Shigetomi | ............. C08F 220/68 |
| | | | 524/548 |

FOREIGN PATENT DOCUMENTS

EP     3689994 A1    8/2020

OTHER PUBLICATIONS

Extended European Search Report issued in European Patent Application No. 21204397.0 on Apr. 19, 2022.

* cited by examiner

*Primary Examiner* — Jessica Whiteley
(74) *Attorney, Agent, or Firm* — Edwards Neils LLC; Jean C. Edwards, Esq.

(57) ABSTRACT

An acrylic pressure-sensitive adhesive (PSA) includes an acrylic polymer produced by free radical polymerization, having a weight-average molecular weight ($M_w$) of less than 830 kDa; a relative peak width at half height (PWHH) of the acrylic polymer is 1.75 or less or, the acrylic polymer has an entanglement molecular weight ($M_e$) of less than 50 kg/mol, the relative PWHH of the acrylic polymer being the ratio of an absolute PWHH of the acrylic polymer determined from differentiated DSC signal of the acrylic polymer at glass transition temperature ($T_g$) to an absolute PWHH of a reference acrylic polymer obtained by reacting ethyl acrylate and acrylic acid in a weight ratio of 100:5 with 10 mmol/l AIBN, wherein the absolute PWHH of the reference acrylic polymer is determined in the same manner as the absolute PWHH of the acrylic polymer, and $M_e$ being calculated from a plateau modulus determined by rheological methods.

15 Claims, 1 Drawing Sheet

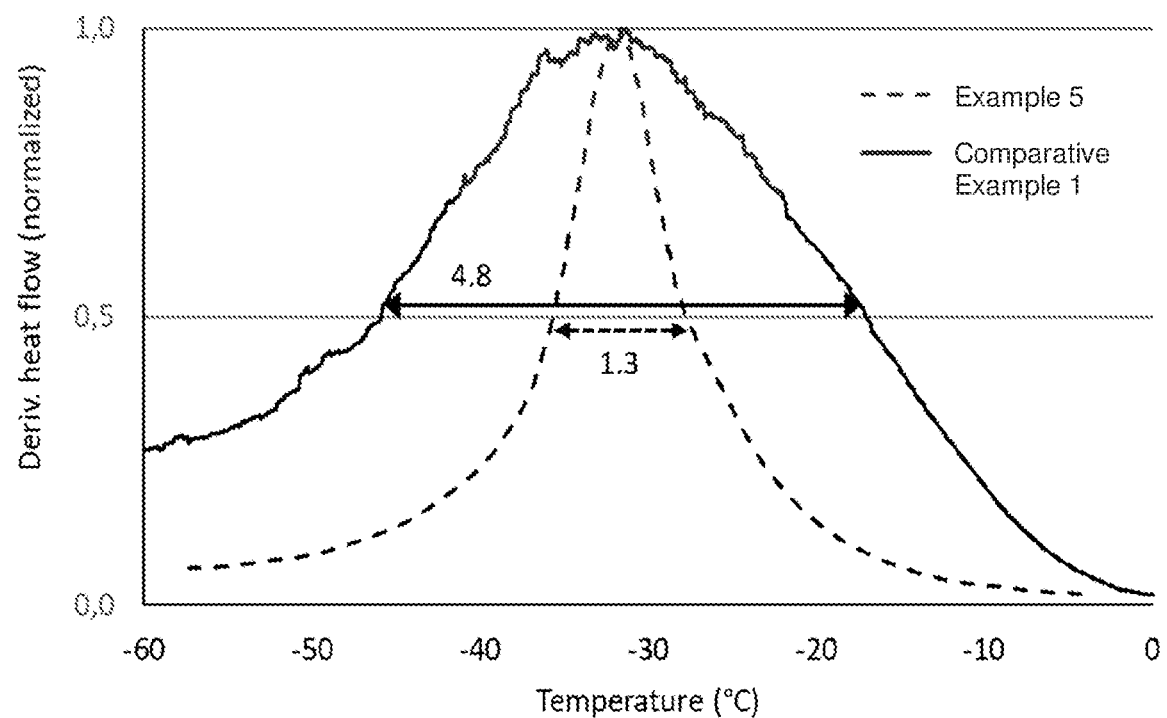

PRESSURE-SENSITIVE ADHESIVE COMPOSITION AND SURFACE PROTECTION SHEETS INCLUDING THE SAME

CROSS-REFERENCE TO RELATED APPLICATIONS

The present application claims priority from European Patent Application No. 21 204 397.0, filed on Oct. 25, 2021, the contents of which are herein incorporated by reference in their entirety.

FIELD OF INVENTION

The present invention relates to a pressure-sensitive adhesive (PSA) composition containing an acrylic polymer produced by free radical polymerization (FRP), which can be used in protection tapes with superior low-fouling and anti-staining properties, and to methods of preparing the pressure-sensitive adhesive (PSA) composition.

Further aspects of the present invention include surface protection sheets comprising the pressure-sensitive adhesive (PSA) composition, and their use for protecting surfaces with high low-fouling and anti-staining requirements during tape application and/or after tape removal, such as physical vapor deposition coatings (e.g. low-E coated glass), high gloss coatings, medical applications, or silicon wafers for chip dicing, for example.

BACKGROUND OF THE INVENTION

Pressure-sensitive adhesive (PSA) tapes are often classified as low-residue type tapes, when no macroscopic residue is visible to the naked eye after tape removal. Examples of such PSA tapes are disclosed in JP 4525811 B2, JP 2014-224208 A, EP 1375621 A1, EP 3029121 A2, US 2016/0177151 A1, US 2019/0016935 A1, US 2019/0338164 A1, CN 110183981 A, for example.

However, PSA compositions or tapes that are also capable of reducing the amount of microscopic residue are different in nature. The preparation of so-called 'low staining' or 'anti-fouling' PSA materials often requires specifically controlled polymerization techniques such as reversible addition-fragmentation chain-transfer (RAFT) (see, e.g., WO 2011/152511 A1 or EP 3 006 533 A1), anionic polymerization (e.g. EP 3 006 533 A1), and Telluride-mediated polymerization (TERP), as is disclosed in WO 2018/016407 A1, for example. However, such methods are not only elaborate but also necessitate special equipment and/or specific catalysts, which results in high production costs.

Another strategy to obtain low-residue adhesives is based on excluding or reducing the amount of low molecular weight species by focusing on the preparation of constituting polymers with high molecular weights (see, e.g., EP 2457967 A1, U.S. Pat. No. 6,602,599 B1, EP 2457968 A1, EP 1108770 A2 and US 2016/0185083 A1). However, this approach leads to PSA compositions with high viscosities, which leads to engineering and coating difficulties and/or requires large solvent quantities and thus renders the product and its manufacturing method expensive and non-sustainable.

Other methods require a specific treatment to avoid residues after tape removal. For instance, EP 2033996 A1 and US 2017/0278739 A1 suggest applying UV radiation before peeling the tape. Further publications describe the treatment of the substrate surface after tape removal by heat (WO 2020/006387 A1, US 2016/0194516 A1) or washing (U.S. Pat. No. 6,682,773 B2). However, such techniques demand specific equipment and elaborate work from the end-user and severely limit the applicability of the produced tape, particularly since the treatment might not be tolerated by the substrate to be protected.

WO 2017/216108 A1 proposes adjusting a low adhesive strength to reduce fouling of the substrate, which is however unsuitable for surface protection applications where high adhesive strengths may be required.

Under these circumstances, an object of the present invention is to provide a PSA composition and a surface protective sheet, which may be produced inexpensively, in an environmentally friendly manner, do not require any special chemical, equipment or method, and simultaneously leave no or only very low amounts of residue on the adherend (e.g., a substrate) upon removal.

SUMMARY OF THE INVENTION

The present invention solves these problems with the subject matter of the claims as defined herein. Further advantages of the present invention will be further explained in detail in the section below.

A first aspect of the present invention acrylic pressure-sensitive adhesive composition comprising an acrylic polymer produced by free radical polymerization, wherein the acrylic polymer has a weight-average molecular weight ($M_w$) of less than 830 kDa; and wherein a relative peak width at half height (PWHH) of the acrylic polymer is 1.75 or less or wherein the acrylic polymer has an entanglement molecular weight ($M_e$) of less than 50 kg/mol, the relative peak width at half height (PWHH) of the acrylic polymer being the ratio of an absolute peak width at half height (PWHH) of the acrylic polymer determined from differentiated DSC signal of the acrylic polymer at the glass transition temperature ($T_g$) to an absolute peak width at half height (PWHH) of a reference acrylic polymer obtained by reacting ethyl acrylate and acrylic acid in a weight ratio of 100:5 with 10 mmol/l AIBN, wherein the absolute peak width at half height (PWHH) of the reference acrylic polymer is determined in the same manner as the absolute peak width at half height (PWHH) of the acrylic polymer, and $M_e$ being calculated from a plateau modulus determined by rheological methods.

A second aspect of the present invention relates to a process for the preparation of the above-defined acrylic pressure-sensitive adhesive compositions, which comprises free radical polymerization of a monomer composition comprising acrylic acid and/or an alkyl (meth)acrylate having an alkyl group with 3 carbon atoms or less.

A third aspect of the present invention relates to a surface protective sheet, comprising: a base material layer; and a pressure-sensitive adhesive layer comprising the above-defined acrylic pressure-sensitive adhesive composition.

A fourth aspect of the present invention relates to the use of the aforementioned surface protective sheet for the protection of PVD-based coatings, high-gloss coatings, silicon wafers, glass surfaces, optical members and medical devices.

Preferred embodiments of the acrylic pressure-sensitive adhesive composition according to the present invention and other aspects of the present invention are described in the following description and the claims.

BRIEF DESCRIPTION OF THE DRAWING

FIG. 1 illustrates the DSC measurements (derivatized heat flow) used for determination of the PWHH of the acrylic polymers of Example 5 and Comparative Example 1.

DETAILED DESCRIPTION OF THE INVENTION

For a more complete understanding of the present invention, reference is now made to the following description of the illustrative embodiments thereof:

Pressure-Sensitive Adhesive Composition

In a first embodiment, the present invention relates to an acrylic pressure-sensitive adhesive composition comprising an acrylic polymer produced by free radical polymerization, wherein the acrylic polymer has a weight-average molecular weight ($M_w$) of less than 830 kDa; and wherein a relative peak width at half height (PWHH) of the acrylic polymer is 1.75 or less or wherein the acrylic polymer has an entanglement molecular weight ($M_e$) of less than 50 kg/mol, the relative peak width at half height (PWHH) of the acrylic polymer being the ratio of an absolute peak width at half height (PWHH) of the acrylic polymer determined from differentiated DSC signal of the acrylic polymer at the glass transition temperature (Tg) to an absolute peak width at half height (PWHH) of a reference acrylic polymer obtained by reacting ethyl acrylate and acrylic acid in a weight ratio of 100:5 with 10 mmol/l AIBN, wherein the absolute peak width at half height (PWHH) of the reference acrylic polymer is determined in the same manner as the absolute peak width at half height (PWHH) of the acrylic polymer, and $M_e$ being calculated from a plateau modulus determined by rheological methods.

In contrast to prior art compositions employing high molecular weight polymers, the acrylic pressure-sensitive adhesive composition according to the present invention exhibits excellent low-fouling and anti-staining performance while providing favorable viscosity properties, which facilitates handling and coating processes without excessive use of organic solvents. From this perspective, it is preferred that the acrylic polymer has a weight-average molecular weight $M_w$ in the range of 120 to 800 kDa, more preferably from 130 to 750 kDa, and especially preferably from 150 to 550 kDa. The method of determination of $M_w$ is not particularly limited and may include light scattering or sedimentation equilibrium techniques, for example. The weight-average molecular weight may be suitably controlled by adjusting the concentration of monomers and/or initiators and through solvent selection during the free radical polymerization. For instance, an increase of $M_w$ can be achieved by lowering the concentration of the initiator or by increasing the monomer concentration, and vice versa.

Molecular motion in crosslinked polymer systems of relatively high molecular weight has been described in the reptation model (see e.g., De Gennes, J. Chem. Phys. 1971, 55, 572). Based on the presupposition that residues after tape removal are a result of migration of species from the PSA matrix towards the substrate, it may be followed that a decreased molecular mobility in turn reduces migration and thus residue formation. As outlined above, the conventional approach to reduce molecular mobility was to employ high $M_w$ polymers. The present inventors found that both free volume and chain mobility may also be effectively reduced by controlling the entanglement molecular weight $M_e$, which is defined as the molecular weight between adjacent temporary entanglement points and is controlled by the molecular architecture of the polymers. Specifically, it has been found that by controlling the entanglement molecular weight ($M_e$) to a range of less than 50 kg/mol, preferably less than 25 kg/mol (e.g. from 5 to 20 kg/mol), and particularly preferably less than 20 kg/mol (e.g. from 10 to 18 kg/mol), the number of entanglements is sufficiently high to reduce molecular mobility in the PSA matrix and thus residue accumulation at the tape-substrate interface even if using polymers with a relatively low weight-average molecular weight ($M_w$). The entanglement molecular weight ($M_e$) may be calculated from a plateau modulus determined by rheological methods (as disclosed in C. Liu et al., Polymer 2006, 27, 4461-4479 or J. D. Ferry, *Viscoelastic Properties of Polymers*, 3rd Ed., John Wiley, New York 1980, for example).

As an alternative to the often cumbersome quantitative determination of $M_e$, it has been found that differential scanning calorimetry (DSC) may be used as a convenient alternative method to correlate the molecular mobility to residue formation. In particular, it has been found that residue accumulation may be effectively reduced or prevented when a relative peak width at half height (PWHH) of the acrylic polymer is 1.75 or less, preferably 1.6 or less, more preferably 1.5 or less, and especially preferably less than 1.4, such as from 0.9 to 1.3. Herein, the relative peak width at half height (PWHH) of the acrylic polymer represents the ratio of an absolute peak width at half height (PWHH) of the acrylic polymer determined from differentiated DSC signal of the acrylic polymer at its glass transition temperature ($T_g$) to an absolute peak width at half height (PWHH) of a reference acrylic polymer obtained by reacting ethyl acrylate and acrylic acid in a weight ratio of 100:5 with 10 mmol/l AIBN, wherein the absolute peak width at half height (PWHH) of the reference acrylic polymer is determined in the same manner as the absolute peak width at half height (PWHH) of the acrylic polymer.

The acrylic polymer comprised in pressure-sensitive adhesive composition according to the present invention is not particularly limited as long as it satisfies the above-defined requirements. However, it is preferable to use at least two co-monomers for the preparation of the acrylic polymer or more.

In preferred embodiments, the acrylic polymer comprises, as a monomer component, (meth)acrylic acid and/or an alkyl (meth)acrylate having an alkyl group with 3 carbon atoms or less. The alkyl (meth)acrylate having an alkyl group with 3 carbon atoms or less is further preferably selected from methyl (meth)acrylate, ethyl (meth)acrylate, n-propyl (meth)acrylate, and isopropyl (meth)acrylate. Notably, the expression "(meth)acrylate", as used herein, generally encompasses methacrylates and acrylates, and also mixtures of both.

Although the entanglement molecular weight ($M_e$) and the PWHH do not solely depend on the choice of (co-)monomers, but also on other components, such as the presence, type and concentration of chain transfer agents, crosslinkers and initiators, for example, the desired ranges may be easier achieved with the following (co-)monomer selection.

Preferably, the total amount of acrylic acid and the alkyl (meth)acrylate having an alkyl group with 3 carbon atoms or less is at least 5 parts by weight, preferably at least 15 parts by weight, and further preferably at least 25 parts by weight, with respect to 100 parts by weight of the total amount of monomer components, such as from 25 parts by weight to 100 parts by weight.

If, as a monomer component, one or more alkyl (meth) acrylates having an alkyl group with 4 carbon atoms are present (i.e. n-butyl (meth)acrylate, sec-butyl (meth)acrylate or isobutyl (meth)acrylate), their total content is preferably less than 97 parts by weight, more preferably less than 95 parts by weight, with respect to 100 parts by weight of the total amount of monomer components.

Also, when the acrylic polymer comprises, as a monomer component, one or more alkyl (meth)acrylates having an alkyl group with more than 4 carbon atoms, their amount is preferably less than 80 parts by weight, more preferably in an amount of less than 60 parts by weight, further preferably less than 40 parts by weight, and especially preferably less than 30 parts by weight with respect to 100 parts by weight of the total amount of monomer components. Examples of such monomers include, but are not limited to hexyl(meth) acrylate, heptyl(meth)acrylate, octyl(meth)acrylate, 2-ethylhexyl(meth)acrylate, decyl(meth)acrylate, isodecyl(meth) acrylate, lauryl(meth)acrylate, tetradecyl(meth)acrylate, hexadecyl(meth)acrylate, stearyl(meth)acrylate, behenyl (meth)acrylate, or mixtures of any two or more thereof.

In general, it may be preferable that alkyl (meth)acrylates having an alkyl group with 4 carbon atoms or more are present in an amount of less than 95 parts by weight, preferably in an amount of less than 85 parts by weight with respect to 100 parts by weight of the total amount of monomer components.

It is noted that further (co-)monomers may be incorporated as long as the desired $M_w$ and $M_e$ or PWWH ranges are satisfied. For example, the acrylic polymer may further comprise one or more a functional monomers. Although not being specifically limited, one or more acrylates comprising a hydroxy, epoxy, alkoxy, acyl, acyloxy, silyl, silyloxy, silane, carboxylic acid, 1,3-dicarbonyl, isocyanato, sulfonic acid, anhydride, alkoxycarbonyl, aryloxycarbonyl, iminoether, imidoether, amidoether, lactone, lactam, amide, acetal, ketal, ketone, oxazolidinone, carbamate, carbonate, halo, dialkylamino, oxaziridine, aziridine, oxazolidine, orthoester, urea, oxetane or cyano group may be mentioned as examples of functional monomer components.

Methods of free radical polymerization for the preparation of the acrylic polymer are not particularly limited and will be described below in conjunction with the second embodiment.

The acrylic pressure-sensitive adhesive composition according to the present invention may further comprise a crosslinking agent. Among crosslinking agents known in the art, non-self-condensation type crosslinking agents are preferred over self-condensation type crosslinking agents (e.g., isocyanates) in terms of lower residue formation. As especially preferred non-self-condensation type crosslinking agents metal chelates, epoxy-based crosslinking agents, or aziridine-based crosslinking agents may be mentioned. Suitable metal chelates are typically polyfunctional metal chelates comprising a polyvalent metal and an organic compound that is covalently or coordinately bonded to the metal (e.g., via an oxygen atom). Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include an alkyl ester, an alcohol, a carboxylic acid, an ether, and a ketone. Examples of aziridine-type crosslinkers include, but are not limited to 1,4-bis(ethyleneiminocarbonylamino)benzene, 4,4'-bis(ethyleneiminocarbonylamino)- diphenylmethane, 1,8-bis(ethyleneiminocarbonylamino)octane, and 1,1'-(1,3-phenylene dicarbonyl)-bis-(2-methylaziridine).

In preferred embodiments, the acrylic pressure-sensitive adhesive composition preferably comprises a chain transfer agent, further preferably in an amount of 0.001 to 5 parts by weight with respect to 100 parts by weight of the total amount of monomer components, preferably between 0.005 to 2 parts by weight.

The chain transfer agent is not particularly limited and typically selected from one or more thiol compounds including monofunctional and polyfunctional thiols. Monofunctional thiols include, but are not limited to, propyl mercaptan, butyl mercaptan, hexyl mercaptan, octyl mercaptan, n-dodecyl mercaptan (DDM), thioglycollic acid, mercaptopropionic acid, alkyl thioglycollates, mercaptoethanol, mercaptoundecanoic acid, thiolactic acid, and thiobutyric acid, among which n-dodecyl mercaptan is preferred. Examples of polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; and octafunctional thiols such as tripentaerythritol octa (3-mercaptopropionate) or tripentaerythritol octathioglycollate.

It is understood that other optional additives can be contained in the pressure-sensitive adhesive composition, including viscosity modifiers (thickeners, etc.), leveling agents, release modifiers, plasticizers, softeners, fillers, colorants (pigments, dyes, etc.), antistatic agents, preservatives, anti-aging agents, ultraviolet absorbers, antioxidants, light stabilizers, and combinations thereof, for example.

Methods of Preparation

In a second embodiment, the present invention relates to a process for the preparation of the acrylic pressure-sensitive adhesive composition according to the first embodiment described above, which comprises free radical polymerization of a monomer composition comprising acrylic acid and/or an alkyl (meth)acrylate having an alkyl group with 3 carbon atoms or less.

The constituents of the acrylic polymer are described in the context of the first embodiment above.

The acrylic polymer may be generally synthesized by free radical polymerization (FRP) under standard conditions known to the person skilled in the art (including solution polymerization methods, emulsion polymerization methods, bulk polymerization methods, suspension polymerization methods, and the like, in the presence of a radical initiator, for example). No special chemical, equipment or method is required for its production, which renders the manufacturing of the PSA composition simple and cost-effective.

In solution polymerization, which may be a preferred polymerization method, the starting monomers may be dissolved at once, continuously or portion wise in a solvent. The solvent used may be suitably selected from known or commonly used organic solvents. Examples thereof include, but are not limited to one or more species selected from aromatic compounds (e.g. toluene, xylene, or the like); aliphatic or alicyclic hydrocarbons (e.g., ethyl acetate, hexane, cyclohexane, methylcyclohexane, or the like); halogenated alkanes (e.g. 1,2-dichloroethane); lower alcohols (e.g., monovalent alcohols having 1 to 4 carbon atoms) such as isopropanol, 1-butanol, sec-butanol, tert-butanol, for example; ethers (e.g. butyl methyl ether); ketones (e.g., methyl ethyl ketone, acetyl acetone); and the like.

The initiator generally used in the polymerization process can be suitably selected from known or commonly used radical polymerization initiators. For instance, an azo-based polymerization initiator can be preferably used. Examples of an azo-based polymerization initiator include 2,2'-azobisisobutyronitrile (AIBN), 2,2'-azobis(2-methylpropionamidine)disulfate salt, 2,2'-azobis(2-amidinopropane)dihydrochloride, 2,2'-azobis[2-(5-methyl-2-imidazolin-2-yl)propane]dihydrochloride, 2,2'-azobis(N,N'-dimethylene isobutylamidine), 2,2'-azobis[N-(2-carboxyethyl)-2-methylpropionamidine]hydrate, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate), and the like. Other examples of a polymerization initiator include persulfate salts such as potassium persulfate, ammonium persulfate, etc.; peroxide-based initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy)cyclododecane, hydrogen peroxide, etc.; substituted-ethane-based initiators such as phenyl-substituted ethane, etc.; aromatic carbonyl compounds; and so on. Further examples of a polymerization initiator include redox-based initiators by combination of a peroxide and a reducing agent (e.g., a peroxide and ascorbic acid, peroxide and an iron(II) salt, persulfate salt and sodium hydrogen sulfite, and the like). Two or more initiators may be used in combination.

The amount of a polymerization initiator can be suitably selected by the skilled artisan depending on the type of initiator and the monomer composition, and will be usually about 0.001 to 1 parts by weight, preferably from 0.01 to 1 part by weight, each with respect to 100 parts by weight of the total amount of monomer components.

The polymerization process may be generally started by methods known in the art, for example by heating the above-described composition comprising the starting monomer(s) and radical polymerization initiator to 20 to 100° C., typically 40 to 90° C. The polymerization temperature can be suitably selected in accordance with the monomer species, the type of solvent, the type of polymerization initiator, etc., to be used.

Crosslinking agents (e.g., the non-self condensation type crosslinkers described above) may be added during or after the heating step.

The thus produced acrylic polymer composition may be diluted with an organic solvent to obtain a viscosity suitable for coating processes. Since the acrylic polymer present in the composition of the present invention has a relatively low weight-average molecular weight ($M_w$), only a minimum amount or no additional organic solvent is required to attain the desired coating viscosity, which contributes to easier handling and particularly to the environmental friendliness of the PSA composition and the surface protection sheets of the present invention.

Surface Protective Sheet and Related Uses

In a third embodiment, the present invention relates to a surface protective sheet, comprising: a base material layer; and a pressure-sensitive adhesive layer comprising the acrylic pressure-sensitive adhesive composition according to the first embodiment described above.

For the base material layer, a resin film is preferably used. Such a resin film may have been formed of a resin material of various types. The resin material may be suitably selected by the skilled artisan depending on the intended use of the surface protective sheet (e.g., to provide transparency, mechanical strength, thermal stability, waterproofing ability, and/or isotropy). In preferred embodiments, the base material layer comprises a polyolefin (e.g. polyethylene, polypropylene, polyolefins having a cyclic or a norbornene structure, ethylene-propylene copolymers, etc.), a polyester (including, but not limited to polyethylene terephthalate (PET), polyethylene naphthalate (PEN), or polybutylene terephthalate, for example), a polyacrylate (e.g., polymethyl methacrylate), a polystyrene (including derivatives, such as acrylonitrile-styrene copolymers, for example), a polyamide (e.g., nylon 6, nylon 6,6, aromatic polyamides, etc.), polyvinyl chloride, polyvinylidene chloride, a polycarbonate or combinations thereof. In addition, resin materials based on cellulose, a polyimide, a polysulfone, a polyethersulfone, a polyetheretherketone, a polyphenylene sulfide, a polyvinyl alcohol, a poly(vinyl butyral), a polyarylate, a polyoxymethylene, an epoxy, or the like, may be mentioned as examples. The resin material constituting the resin film may be a blend of two or more species among these.

The thickness of the base material layer can be suitably selected in view of the intended application of the surface protective sheet. Usually, the base material layer will a thickness of suitably about 1 μm to 2000 μm, such as from about 5 μm to 1000 μm.

The thickness of the pressure-sensitive adhesive layer is likewise not particularly limited and may be appropriately selected by the skilled artisan. Typical thicknesses range from 0.1 μm to 200 μm, such as from about 0.5 μm to 100 μm.

The pressure-sensitive adhesive composition may be applied directly onto the base material layer to contact the same. Alternatively, one or more intermediate layers may be interposed between the base material layer and the adhesive layer. Such intermediate layers are not particularly limited any may include one or more of a foam layer or a structural When applying the PSA composition, various methods conventionally known in the field of surface protection films can be suitably employed, such as roll coating, gravure roll coating, reverse roll coating, roll brushing, spray coating, air knife coating, die coating, and the like.

The surface protective sheet disclosed herein may be provided in a form where a release liner is adhered to the adhesive surface opposed to the side of the base material layer. For the release liner, materials based on papers, woven materials, metal foils or polymeric films (including, but not limited to polyester resins (e.g., polyethylene terephthalate (PET)), acrylic resins (e.g., polymethyl methacrylate (PMMA), polycarbonate, triacetyl cellulose (TAC), polysulfone, polyarylate, polyimide, polyvinyl chloride, polyvinyl acetate, polyethylene (PE), polypropylene (PP), ethylene-propylene copolymer, cyclic olefin-based polymers, and a combination thereof) may be used. The thickness of the release liner may be, for instance, about 5 μm to 200 μm, and it is usually preferable to be about 10 μm to 100 μm.

Upon application on the surface of an adherend subsequent removal, the surface protective sheet according to the present invention advantageously leaves no or only very low amounts of residue on the adherend surface.

Specific detection methods, such as color measurement, surface free energy (SFE) via contact angle, or even chemical methods such as mass spectrometry (e.g. TOF-Sims), are required to observe the remaining residues. For instance, the SFE of a glass substrate tends to decrease compared to the pristine surface when adhesive residues are left behind. In this respect, it is preferable that the difference between the SFE of a pristine, blank glass surface and the same glass surface, upon which the surface protective sheet has been previously adhered, is less than 8 mN/m, more preferably less than 5 mN/m, even more preferably less than 2 mN/m. Further preferably, the SFE of a glass surface upon tape removal is higher compared to the untreated pristine glass surface. The SFE may be measured according to methods known in the art, and one example thereof will be further explained in the experimental section below.

The surface protective sheet of the present invention provides a satisfactory adhesive strength towards a wide range of adherends and may be thus used in a large variety of applications. In view of the excellent low-fouling and low-staining properties, the surface protective sheet can be preferably used in, for example, an application where the surface of a member such as a silicon wafer, a metal plate (e.g. aluminum or steel plate), a coated plate, a resin plate, a laminated metal plate, or a glass plate, an optical member such as a polarizing sheet or a liquid crystal panel, an electronic member, or the like is protected by attaching the sheet to the surface of any such member during transport, mounting or processing of the member or for permanent protection purposes.

In a fourth embodiment, the present invention therefore relates to the use of a surface protective sheet according to the third embodiment for the protection of PVD-based coatings, high-gloss coatings, silicon wafers, glass surfaces, optical members and medical devices, applications which require particularly high low-fouling and anti-staining performance.

It will be understood that the preferred features of the first to fourth embodiments may be freely combined in any combination, except for combinations where at least some of the features are mutually exclusive.

EXAMPLES

Preparation of Pressure-Sensitive Adhesive Compositions and Surface Protection Sheets Examples For the preparation of Example 1, the monomers ethyl acrylate (100 g) and acrylic acid (6 g) were dissolved in ethyl acetate. The mixture was degassed using a nitrogen flow of 0.5 liters per minute for 1 hour. Subsequently, the mixture was heated to 58° C. and then azoisobutyronitrile (AIBN; 10 mmol/l) was added as initiator. The reaction mixture became exothermic and was kept at a constant temperature for 5 hours. Thereafter, the mixture was heated to 70° C. to react all the residual monomer and initiator. After cooling, the polymer solution was used for the adhesive formulation. To prepare PSA tapes, a crosslinker of the non-self-condensation type was added and the mixture was diluted with solvent to obtain the desired coating viscosity. PE sheets were coated via roll-over-roll method to a dry adhesive thickness between 2 and 10 µm. The weight-average molecular weight of the polymer was determined via GPC as being $M_w$=510 kg/mol, and the $M_e$ was calculated from the density and plateau modulus determined by rheological methods to be less than 50 kDa.

The sample of Example 2 was prepared in the same manner as Example 1, except that 70 g of ethyl acrylate, 5 g of acrylic acid and 0.3 g of dodecyl mercaptane 0.3 g were reacted in ethyl acetate with 6 mmol/L AIBN ($M_w$=385 kg/mol; $M_e$<50 kDa).

Example 3 was prepared in the same manner as Example 1, except that ethyl acrylate (100 g), acrylic acid (6 g) and dodecyl mercaptane (0.2 g) were reacted in ethyl acetate with 6 mmol/L benzoyl peroxide ($M_w$=150 kg/mol; $M_e$<50 kDa).

Example 4 was prepared in the same manner as Example 1, except that ethyl acrylate (80 g), butyl acrylate (26 g), acrylic acid (6 g) and dodecyl mercaptane (0.05 g) were reacted in ethyl acetate with 6 mmol/L AIBN ($M_w$=394 kg/mol; $M_e$<50 kDa).

Example 5 was prepared in the same manner as Example 1, except that ethyl acrylate (20 g), butyl acrylate (102 g), acrylic acid (6 g) and dodecyl mercaptane (0.05 g) were reacted in ethyl acetate with 6 mmol/L AIBN ($M_w$=487 kg/mol; $M_e$<50 kDa).

Example 6 was prepared in the same manner as Example 1, except that butyl acrylate (90 g) and acrylic acid (5 g) were reacted in ethyl acetate with 6 mmol/L benzoyl peroxide ($M_w$=630 kg/mol; $M_e$<50 kDa).

Example 7 was prepared in the same manner as Example 1, except that butyl acrylate (129 g) and acrylic acid (6 g) were reacted in ethyl acetate with 6 mmol/L AIBN ($M_w$=435 kg/mol; $M_e$<50 kDa).

Comparative Examples

Comparative Example 1 was prepared in the same manner as Example 1, except that butyl methacrylate (75 g), isooctyl acrylate (70 g), 2-hydroxyethyl acrylate (3 g) and acrylic acid (2 g) were reacted in toluene and acetone with 1.8 mmol/L AIBN. The weight-average molecular weight of the polymer was determined via GPC as being $M_w$=613 kg/mol, and the $M_e$ was calculated from the density and plateau modulus determined via rheological methods to be higher than 50 kDa Comparative Example 2 was prepared in the same manner as Example 1, except that 2-ethylhexyl acrylate (185 g) and acrylic acid (7 g) were reacted in ethyl acetate with 6 mmol/L AIBN ($M_w$=529 kg/mol; $M_e$>50 kDa).

Comparative Example 3 was prepared in the same manner as Example 1, except that butyl acrylate (90 g) and acrylic acid (5 g) were reacted in ethyl acetate with 2 mmol/L benzoyl peroxide ($M_w$=830 kg/mol, $M_e$<50 kDa).

Comparative Example 4 was prepared in the same manner as Example 1, except that ethyl acrylate (80 g), 2-ethylhexyl acrylate (37 g), acrylic acid (6 g) and dodecyl mercaptane (0.04 g) were reacted in ethyl acetate with 6 mmol/L AIBN ($M_w$=478 kg/mol, $M_e$>50 kDa).

Comparative Example 5 was prepared in the same manner as Example 1, except that ethyl acrylate (20 g), 2-ethylhexyl acrylate (147 g), acrylic acid (6 g) and dodecyl mercaptane (0.04 g) were reacted in ethyl acetate with 6 mmol/L AIBN ($M_w$=409 kg/mol, $M_e$>50 kDa).

PWHH Measurements

The relative peak width at half height (PWHH) of the polymers of Examples 2 to 7 and Comparative Examples 1 to 5 was determined via DSC as the ratio of an absolute peak width at half height (PWHH) of the respective polymer determined from differentiated DSC signal at the glass transition temperature ($T_g$) to an absolute peak width at half height (PWHH) of the reference acrylic polymer of Example 1. The results are listed in Table 1 below.

The PWHH was calculated from the derivatized heat flow (DSC trace) after normalization. As an illustration, the differences in relative PWHH of the polymers of Example 5 and Comparative Example 1 are shown in FIG. 1. Notably, both polymers exhibit a comparable glass transition temperature ($T_g$), which shows that the PWHH is independent of $T_g$, but can be inter alia controlled by monomer selection.

Residue Detection Methods

Color Measurement

Coated glass for color measurement was provided by Guardian Industries and was used as received. The glass samples were stored at 23° C. and 50% relative humidity (rH) prior to use.

Tape samples were laminated on the coated side and this complex was aged for 2 days at 60° C. The complexes were left for 1 h at 23° C., 50% rH before tape removal by hand. Color measurement was done on the coating side of the glass with a black EPDM foam covering the back side, using a Konica Minolta CM-5 spectrophotometer in reflectance-SCI mode and illumination area of 8 mm. The presence of residue after tape removal tends to change the color of the coating side by increasing the optical path length. The average of six measurements in a* and b* were calculated and the absolute difference from the pristine coating (also measured after ageing) was determined (in Table 1, indicates a small, "○" an intermediate, and "−" a large difference).

SFE Measurement

Cleaning of uncoated glass for SFE measurement was done using paper towels and analytical grade solvents as follows: acetone, 4-hydroxy-4-methylpentan-2-one and acetone again. The substrates were left for at least 60 min at 23° C. and 50% rH before tape application.

Tape samples were laminated on the analysis substrate and this complex was aged for 2 days at 60° C. The complexes were left for 1 h at 23° C., 50% rH before tape removal by hand. Surface free energy (SFE) measurements were done on a Krüss DSA25E, using the double sessile drop method. Contact angles of diiodomethane and water were used to calculate SFE via the OWRK (Owens, Wendt, Rabel und Kaelble) method (see D. H. Kaelble, Dispersion-Polar Surface Tension Properties of Organic Solids. In: J. Adhesion 2 (1970), P. 66-81; D. Owens; R. Wendt, Estimation of the Surface Free Energy of Polymers. In: J. Appl. Polym. Sci. 13 (1969), P. 1741-1747; W. Rabel, *Einige Aspekte der Benetzungstheorie und ihre Anwendung auf die Untersuchung und Veränderung der Oberflächeneigenschaften von Polymeren.* In: Farbe und Lack 77, 10 (1971), p. 997-1005). The average of six measurements was taken for each sample and the pristine surface (no tape applied). The amount of residue was correlated to the decrease in SFE from the pristine glass surface. In Table 1, "+" indicates a particularly small or negative difference (i.e. increase), "○" indicates an intermediate difference (i.e. acceptably small decrease), and "−" indicates a large difference (i.e. high decrease) between the surface free energy of the blank glass surface and the glass surface upon tape removal.

For the preparation of the samples, each PSA mixture was diluted with solvent to a workable coating viscosity. For the viscosity evaluation in Table 1, "+" denotes a good PSA viscosity, whereas "−" denotes an unacceptably high viscosity requiring high amounts of solvent for sufficient dilution to enable coating.

TABLE 1

| Sample | $M_e$ (kDa) | PWHH (normalized) | $M_w$ (kDa) | Residue Evaluation | | |
|---|---|---|---|---|---|---|
| | | | | ΔSFE | Color | Viscosity |
| Example 1 | <50 | 1.0 | 510 | + | + | + |
| Example 2 | <50 | 1.2 | 385 | + | + | + |
| Example 3 | <50 | 1.3 | 150 | + | + | + |
| Example 4 | <50 | 1.3 | 394 | + | + | + |
| Example 5 | <50 | 1.3 | 487 | + | + | + |
| Example 6 | <50 | 1.4 | 630 | ○ | ○ | + |
| Example 7 | <50 | 1.5 | 435 | ○ | ○ | + |
| Comparative Example 1 | >50 | 4.8 | 613 | − | − | + |
| Comparative Example 2 | >50 | 3.1 | 529 | − | − | + |
| Comparative Example 3 | <50 | 1.3 | 830 | + | + | − |
| Comparative Example 4 | >50 | 1.8 | 478 | − | − | + |
| Comparative Example 5 | >50 | 3.3 | 409 | − | − | + |

The experimental results summarized in Table 1 demonstrate that the PSA composition of the present invention leaves no or only very low amounts of residue on the adherend while providing excellent viscosity properties for facilitated coating. Moreover, the PSA compositions were produced in a straightforward and inexpensive manner without excessive use of organic solvents. In this respect, Examples 1 to 5, wherein the normalized PWHH was less than 1.4, performed particularly well.

On the other hand, substantial amounts of residues were observed in the case of Comparative Examples 1, 2, 4 and 5, which exhibit a similar $M_w$ but higher PWWH or $M_e$.

With respect to Comparative Example 3, low amounts of residues were observed as well. However, the respective sample exhibited an undesirably high viscosity and required substantial amounts of organic solvent to enable sufficient coatability.

Once given the above disclosure, many other features, modifications, and improvements will become apparent to the skilled artisan.

The invention claimed is:

1. An acrylic pressure-sensitive adhesive composition comprising an acrylic polymer produced by free radical polymerization,
   wherein the acrylic polymer has a weight-average molecular weight ($M_w$) of less than 830 kDa;
   wherein a relative peak width at half height (PWHH) of the acrylic polymer is 1.75 or less or wherein the acrylic polymer has an entanglement molecular weight ($M_e$) of less than 50 kg/mol,
   the relative peak width at half height (PWHH) of the acrylic polymer being the ratio of an absolute peak width at half height (PWHH) of the acrylic polymer determined from differentiated DSC signal of the acrylic polymer at the glass transition temperature ($T_g$) to an absolute peak width at half height (PWHH) of a reference acrylic polymer obtained by reacting ethyl acrylate and acrylic acid in a weight ratio of 100:5 with 10 mmol/l AIBN, wherein the absolute peak width at half height (PWHH) of the reference acrylic polymer is determined in the same manner as the absolute peak width at half height (PWHH) of the acrylic polymer, and
   $M_e$ being calculated from a plateau modulus determined by rheological methods; and
   wherein, when the acrylic polymer comprises one or more alkyl (meth)acrylates having an alkyl group with more than 4 carbon atoms as a monomer component, their amount is less than 40 parts by weight with respect to 100 parts by weight of the total amount of monomer components.

2. The acrylic pressure-sensitive adhesive composition according to claim 1, wherein the relative peak width at half height (PWHH) of the acrylic polymer is 1.6 or less.

3. The acrylic pressure-sensitive adhesive composition according to claim 1, wherein the acrylic polymer has a weight-average molecular weight Mw in the range of 120 to 800 kDa.

4. The acrylic pressure-sensitive adhesive composition according to claim 1, wherein the acrylic polymer has an entanglement molecular weight Me of less than 25 kg/mol, Me being calculated from a plateau modulus determined by rheological methods.

5. The acrylic pressure-sensitive adhesive composition according to claim 1, wherein the acrylic polymer comprises, as a monomer component, (meth)acrylic acid and/or an alkyl (meth)acrylate having an alkyl group with 3 carbon atoms or less.

6. The acrylic pressure-sensitive adhesive composition according to claim 5, wherein the alkyl (meth)acrylate having an alkyl group with 3 carbon atoms or less is selected from methyl (meth)acrylate, ethyl (meth)acrylate, n-propyl (meth)acrylate, and isopropyl acrylate.

7. The acrylic pressure-sensitive adhesive composition according to claim 5, wherein the total amount of acrylic acid and the alkyl (meth)acrylate having an alkyl group with 3 carbon atoms is at least 5 parts by weight with respect to 100 parts by weight of the total amount of monomer components.

8. The acrylic pressure-sensitive adhesive composition according to claim 1, further comprising a chain transfer agent selected from one or more thiol compounds.

9. The acrylic pressure-sensitive adhesive composition according to claim 1, further comprising a crosslinking agent.

10. The acrylic pressure-sensitive adhesive composition according to claim 1, wherein the acrylic polymer comprises, as a functional monomer component, one or more acrylates comprising a hydroxy, epoxy, alkoxy, acyl, acyloxy, silyl, silyloxy, silane, carboxylic acid, 1,3-dicarbonyl, isocyanato, sulfonic acid, anhydride, alkoxycarbonyl, aryloxycarbonyl, iminoether, imidoether, amidoether, lactone, lactam, amide, acetal, ketal, ketone, oxazolidinone, carbamate, carbonate, halo, dialkylamino, oxaziridine, aziridine, oxazolidine, orthoester, urea, oxetane or cyano group.

11. The acrylic pressure-sensitive adhesive composition according to claim 1, wherein the acrylic polymer comprises, as a monomer component, one or more alkyl (meth) acrylates having an alkyl group with 4 carbon atoms or more in an amount of less than 95 parts by weight with respect to 100 parts by weight of the total amount of monomer components.

12. A process for the preparation of the acrylic pressure-sensitive adhesive composition according to claim 1, which comprises free radical polymerization of a monomer composition comprising acrylic acid and/or an alkyl (meth) acrylate having an alkyl group with 3 carbon atoms or less.

13. A surface protective sheet, comprising:
 a base material layer; and
 a pressure-sensitive adhesive layer comprising the acrylic pressure-sensitive adhesive composition according to claim 1.

14. The surface protective sheet according to claim 13, wherein the base material layer comprises a polyolefin, polyester, polyacrylate, polystyrene, polyamide, polyvinyl chloride, polyvinylidene chloride, polycarbonate or combinations thereof.

15. A method of using the surface protective sheet according to claim 13 for the protection of PVD-based coatings, high-gloss coatings, silicon wafers, glass surfaces, optical members and medical devices,
 the method comprising the step of attaching the surface protective sheet on the surface of a PVD-based coating, high-gloss coating, silicon wafer, glass surface, optical member or medical device via the pressure-sensitive adhesive layer.

* * * * *